United States Patent
Kelley et al.

(10) Patent No.: US 7,120,794 B2
(45) Date of Patent: Oct. 10, 2006

(54) SYSTEM FOR INVOKING A PRIVILEGED FUNCTION IN A DEVICE

(75) Inventors: Brian Harold Kelley, San Diego, CA (US); Ramesh Chandrasekhar, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 440 days.

(21) Appl. No.: 10/697,355

(22) Filed: Oct. 29, 2003

(65) Prior Publication Data

US 2005/0251864 A1 Nov. 10, 2005

(51) Int. Cl.
*H04L 9/00* (2006.01)
(52) U.S. Cl. ............... 713/164; 726/2; 726/28
(58) Field of Classification Search ........... 713/164
See application file for complete search history.

(56) References Cited

U.S. PATENT DOCUMENTS

| | | | |
|---|---|---|---|
| 6,175,916 B1 * | 1/2001 | Ginsberg et al. ........... 712/228 |
| 6,553,384 B1 * | 4/2003 | Frey et al. ............... 707/103 R |
| 6,931,546 B1 * | 8/2005 | Kouznetsov et al. ......... 717/174 |
| 2002/0138727 A1 * | 9/2002 | Dutta et al. ................ 713/167 |
| 2003/0031148 A1 * | 2/2003 | Schmidt et al. ............ 370/337 |
| 2003/0140245 A1 * | 7/2003 | Dahan et al. ............... 713/200 |
| 2003/0221035 A1 * | 11/2003 | Adams ....................... 710/301 |
| 2005/0076186 A1 * | 4/2005 | Traut ............................. 712/1 |

* cited by examiner

*Primary Examiner*—Kambiz Zand
(74) *Attorney, Agent, or Firm*—Philip R. Wadsworth; Robert J. O'Connell

(57) ABSTRACT

System for invoking a privileged function in a device. The system includes a method that allows an application to invoke a function on a device, wherein the device includes at least two operating modes comprising a privileged mode and a non-privileged mode, and the function executes in the privileged mode. The method includes receiving a request from the application to invoke the function and determining the operating mode of the application. The method also includes invoking the function using an interrupt, if the application is executing in the non-privileged mode, wherein the function is executed within the same task as the application. The method also includes invoking the function directly, if the application is executing in the privileged mode.

18 Claims, 3 Drawing Sheets

SYSTEM FOR INVOKING A PRIVILEGED FUNCTION IN A DEVICE

CROSS REFERENCE TO RELATED APPLICATIONS

This application is related to U.S. patent application Ser. No. 10/697,592, entitled "SYSTEM FOR PROVIDING TRANSITIONS BETWEEN OPERATING MODES OF A DEVICES," filed concurrently herewith, assigned to the assignee hereof, and expressly incorporated by reference herein.

BACKGROUND

I. Field

The present invention relates generally to the efficient operation of a device, and more particularly, to a system for invoking a privileged function in a device.

II. Description of the Related Art

Advances in technology have resulted in the development of a variety of devices for home, office, and personal use. For example, computer systems, such as desktops, notebooks, and tablet computers have become powerful tools for use at home or in office environments. Personal devices, such as wireless telephones, personal digital assistants (PDAs), and paging devices have also become more powerful and are now widely used.

Many devices now comprise complex hardware and software that run operating systems such as UNIX, LINUX, or similar operating systems. Generally, these operating systems provide for multiple modes of operation. For example, most systems provide privileged and non-privileged modes of operation. Programs executing in the privileged mode of operation are allowed to access memory and system resources without limitation. Programs executing in the non-privileged mode are restricted from accessing certain memory regions and/or device systems. This configuration provides a level of protection to important memory or device functions. For example, by executing third-party applications in the non-privileged mode, important memory regions and device functions can be protected from unauthorized access. Also, such an arrangement allows the system to isolate faults during execution.

However, in some situations, it is desirable to allow privileged mode functions to be invoked from applications executing in either the privileged or non-privileged mode. For example, it is desirable for a privileged mode application to have access to privileged mode functions, but it is also desirable for an application executing in the non-privileged mode to have access to the same privileged functions. For example, it may be desirable to allow an application to have access to a selected system file, or device hardware, such as a device modem.

Unfortunately, conventional systems utilize a trap to suspend execution of the non-privileged application while a separate privileged mode "kernel" task performs the requested operation. As a result, the new privileged mode task results in additional scheduling complexity and overhead. There may also be additional system delays in the form of dispatcher latency. Furthermore, the new task may execute at a different priority than the non-privileged application from which it was invoked, thereby further complicating system scheduling and operation.

Therefore, what is needed is a system that provides a way for an application, executing in either the privileged or non-privileged mode, to invoke a privileged function to execute within the same task as the application, thereby providing access to privileged mode hooks to applications executing under either mode.

SUMMARY

In one or more embodiments, a system comprising methods and/or apparatus operates to provide access to privileged mode hooks from applications executing in either the privileged or non-privileged mode. For example, in one embodiment, the system provides a function handler that allows an application running in non-privileged mode to execute privileged mode functions within the same task (or execution thread), thereby avoiding task creation, scheduling, and dispatcher latency. The function handler is also accessible to privileged applications to allow those applications to execute privileged functions. Thus, the system maps well into existing software because access to privileged mode functions can be accomplished without changing the existing software model.

In one or more embodiments, the function handler operates to determine whether a calling application is executing in the privileged or non-privileged mode. If the calling application is executing in privileged mode, the function handler calls the privileged function directly. If the calling application is executing in non-privileged mode, the function handler generates an interrupt that is processed by, for example, a transition system that allows the privileged function to be called within the same task as the calling non-privileged application. Thus, the function handler operates to provide privileged function hooks to both privileged and non-privileged applications.

In one embodiment, the calling application passes a function identifier to the function handler. The function identifier identifies functions that are available for execution. In one embodiment, the function handler determines the function from the identifier and calls the function directly. In another embodiment, the function handler generates an interrupt and passes the identifier to the transition system, which uses the identifier to call the requested function after proper validation. The interrupt may be a software, hardware, or exception based interrupt.

In one embodiment, a method is provided that allows an application to invoke a function on a device, wherein the device includes at least two operating modes comprising a privileged mode and a non-privileged mode, and the function executes in the privileged mode. The method comprises receiving a request from the application to invoke the function and determining the operating mode of the application. The method also comprises invoking the function using an interrupt, if the application is executing in the non-privileged mode, wherein the function is executed within the same task as the application. The method also comprises invoking the function directly, if the application is executing in the privileged mode.

In another embodiment, apparatus is provided that allows an application to invoke a function on a device, wherein the device includes at least two operating modes comprising a privileged mode and a non-privileged mode, and the function executes in the privileged mode. The apparatus comprises logic that receives a request from the application to invoke the function. The apparatus also comprises logic that determines the operating mode of the application. The apparatus also comprises logic to invoke the function using an interrupt, if the application is executing in the non-privileged mode, wherein the function is executed within the same task as the application. The apparatus also comprises logic to invoke the function directly, if the application is executing in the privileged mode.

In another embodiment, apparatus is provided that allows an application to invoke a function on a device, wherein the device includes at least two operating modes comprising a privileged mode and a non-privileged mode, and the function executes in the privileged mode. The apparatus comprises means for receiving a request from the application to invoke the function and means for determining the operating mode of the application. The apparatus also comprises means for invoking the function using an interrupt, if the application is executing in the non-privileged mode, wherein the function is executed within the same task as the application. The apparatus also comprises means for invoking the function directly, if the application is executing in the privileged mode.

In another embodiment, a computer-readable media is provided comprising instructions, which when executed by a processor in a device, operate to allow an application to invoke a function on a device, wherein the device includes at least two operating modes comprising a privileged mode and a non-privileged mode, and the function executes in the privileged mode. The computer-readable media comprises instructions for receiving a request from the application to invoke the function and instructions for determining the operating mode of the application. The computer-readable media also comprises instructions for invoking the function using an interrupt, if the application is executing in the non-privileged mode, wherein the function is executed within the same task as the application. The computer readable media also comprises instructions for invoking the function directly, if the application is executing in the privileged mode.

Other aspects, advantages, and features of the present invention will become apparent after review of the hereinafter set forth Brief Description of the Drawings, Detailed Description of the Invention, and the claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes a function handler system that provides privileged function hooks to privileged and non-privileged applications. For example, the system operates to receive function calls from privileged and non-privileged applications, after which, the operating mode of the calling application is determined, and a fast and efficient transition to the privileged function is provided. The function executes within the same thread of execution as the calling application. Thus, the function handler provides privileged function hooks to both privileged and non-privileged applications, which are then able to call privileged functions without a new task being generated, thereby avoiding the overhead of new task creation, scheduling and dispatcher latency.

In one or more embodiments, the function handler system interacts with a runtime environment (or operating system) executing on the device that is used to simplify operation of the device, such as by providing generalized calls for device specific resources. One such runtime environment is the Binary Runtime Environment for Wireless™ (BREW™) software platform developed by QUALCOMM, Inc., of San Diego, Calif. The following description describes a device executing a runtime environment, such as the BREW software platform. However, in one or more embodiments, the registration system is suitable for use with other types of runtime environments to provide fast and efficient registration of privileged function hooks in a variety of devices, including generating systems or other controlling or monitoring programs. For example, the devices may include, but are not limited to, desktop computers, notebook computers, handheld computers, and portable devices, such as wireless telephones, pagers, PDAs, email devices, tablet computers, or other type of computing devices.

Figure 1:
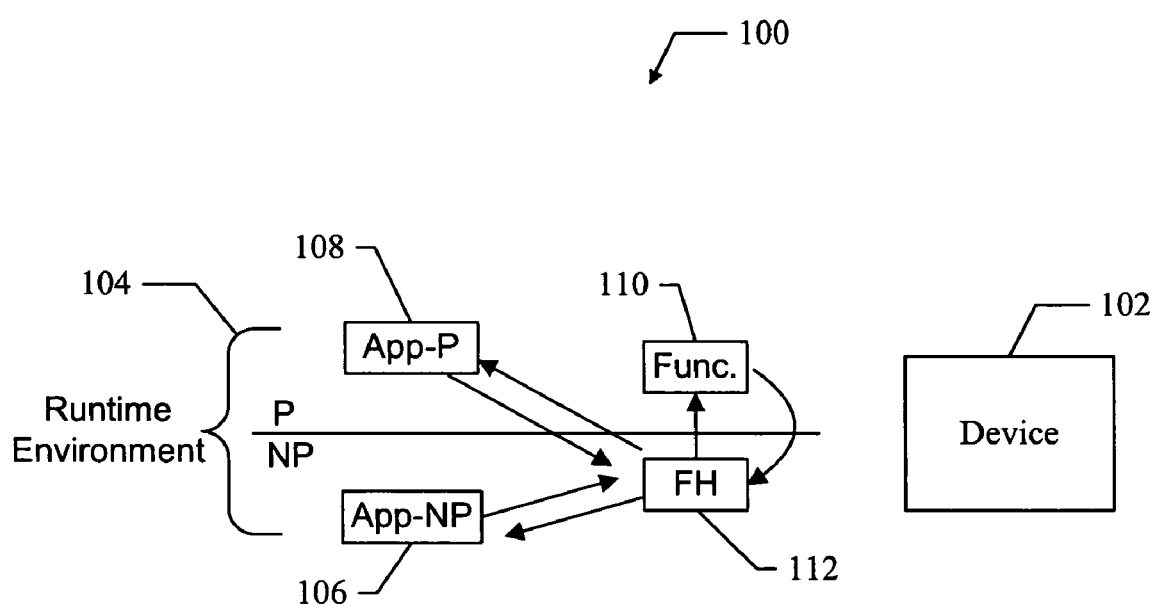
FIG. 1 shows one embodiment of a function handler system that provides privileged function hooks to privileged and non-privileged applications executing on a device 102.

FIG. 1 shows one embodiment of a function handler system 100 that provides privileged function hooks to privileged and non-privileged applications executing on a device 102. The system 100 may be part of a home computer, office computer, or personal device, such as a wireless telephone or PDA, or any other type of computing device. During operation, one or more applications execute on the device 102 and operate to provide information, functions, and/or services to the device 102. For example, one type of application may be a viewer application that operates to allow the device 102 to display movies, news, or other types of multimedia content.

In one embodiment, the device 102 includes a runtime environment 104 (i.e., BREW) that provides at least two modes of operation; namely a non-privileged mode (NP) and a privileged mode (P). The non-privilege mode of operation is used to restrict the access of applications running on the device and to provide fault detection. For example, applications running in non-privileged mode are restricted to selected memory regions and may be denied access to device registers or other resources. The privileged mode of operation allows applications running under this mode to access memory or device resources without limitation.

When an application executes on the device 102, it runs under the runtime environment to provide the desired functionality. For example, the application 106 runs on the device 102 under the non-privileged mode (NP), and the application 108 runs on the device 102 in the privileged mode (P). Either of these applications may require functions or system services that are available through a privileged function 110. For example, the applications may need to access privileged memory or device hardware resources. To obtain these functions or services, the function handler system 100 provides a mechanism that allows either application (106, 108) to call the privileged function through a function handler 112. When called through the function handler 112, the function 110 executes within the same thread of execution as the calling application. After the function 110 performs the requested service, program control returns to the calling application.

As a result, the function handler system 100 provides a fast and efficient mechanism to allow privileged and non-privileged applications to perform privileged functions without the need for a new task to be created and scheduled for execution by the runtime environment, thereby eliminating scheduler complexity and associated dispatcher latency.

Figure 2:
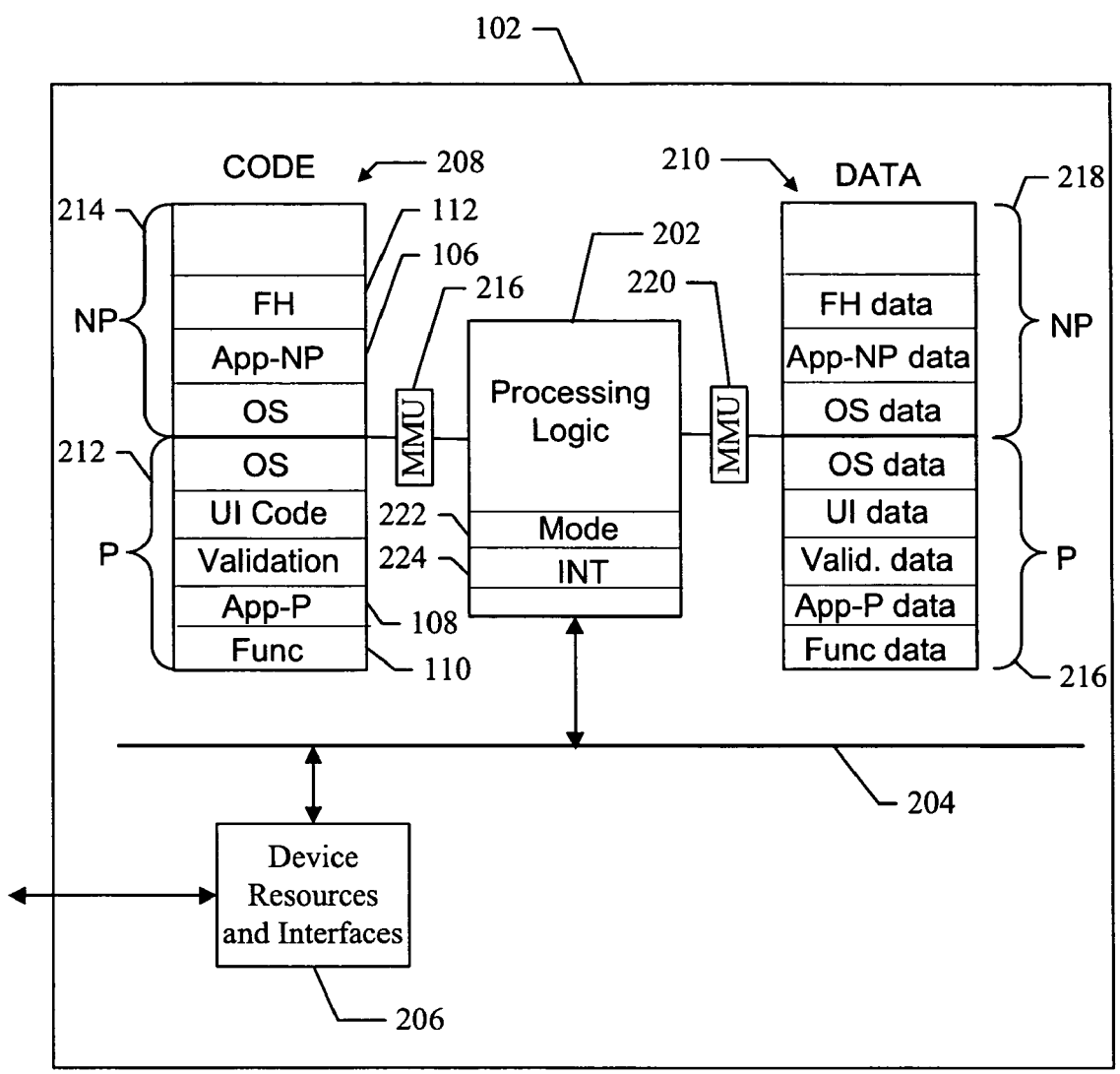
FIG. 2 shows a detailed block diagram of a device comprising one embodiment of a function handler system.

FIG. 2 shows a detailed block diagram of the device 102 comprising one embodiment of a function handler system. The device 102 comprises processing logic 202 and device resources 206 that are coupled to an internal data bus 204. The device resources 206 comprise hardware, software, memory, logic, or other resources that allow the device to interface to various internal and external resources, devices, or systems. Also coupled to the processing logic 202 are code memory 208 and data memory 210.

In one or more embodiments, the processing logic 202 comprises a CPU, processor, gate array, hardware logic, memory elements, virtual machine, software, I/O interfaces, and/or any combination of hardware and software. Thus, the processing logic 202 generally comprises logic to execute machine-readable instructions. For example, instructions may be loaded into the device 102 from a computer-readable media, such as a floppy disk, CDROM, Flash memory, or other computer-readable media that interfaces to the device 102 via the device resources 206. In another embodiment, the instructions may be downloaded into the device 102 from a network resource, such as a network server or any other type of network resource that interfaces to the device 102 via the device resources 206. The instructions, when executed by the processing logic 202, provide one or more embodiments of a function handler system as described herein.

In one embodiment, code memory 208 comprises RAM, ROM, FLASH, EEROM, or any other suitable type of memory, or a combination thereof. The code memory 206 is partitioned into a privileged region (P) 212 and a non-privileged region (NP) 214 through the operation of a memory management unit 216. The MMU 216 operates to restrict the operation of non-privileged program code so that non-privileged code has limited access rights to selected regions of the code memory 208.

The privileged region 212 includes program code that when executed has unrestricted access to the memory or other systems of the device 102. For example, the privileged code region 212 comprises operating system code (OS), user interface code (UI), validation code, application code (App-P) 108 and privileged function code FUNC 110. The code shown in the privileged code region 212 is representative of the types of privileged code that may be included in the device 102. It is also possible that the privileged code region 212 includes other types of privileged code for execution on the device 102.

The non-privileged code region 214 includes program code that when executed is restricted to accessing only selected memory regions. For example, the non-privileged code region 214 comprises OS code and application code (App-NP) 106, and the function handler 106. In one or more embodiments, the FH 106 may be downloaded to the device 102 from a network or system, installed at device manufacture, or added to the device from a computer-readable media.

In one embodiment, data memory 210 comprises a privileged region 216 and a non-privileged region 218. The privileged region 226 comprises data regions that may be accessed only by privileged program code. For example, the privileged data region 216 comprises data used by the OS, UI, validation, App-P and FUNC code. The non-privileged data region 218 includes data regions that may be accessed by non-privileged program code. For example, the non-privileged data region 218 comprises data used by the non-privileged OS, App-NP, and FH program code. Also coupled to the data memory 210 is a memory management unit (MMU) 220. The MMU 220 operates to restrict access to the non-privileged and privileged data regions. For example, a non-privileged application is restricted from accessing data in the privileged data region 216, or data belonging to other non-privileged applications in the non-privileged data region 218.

The processing logic 202 also comprises mode logic 222 and interrupt logic 224. The mode logic 222 comprises a CPU, processor, logic, device registers, software, or any combination of hardware and software that operates to allow a mode change between operating modes of the device 102. For example, in one embodiment, the mode logic 222 comprises a register whose bits set the operating mode. For example, to switch from privileged mode to non-privileged mode, selected bits in the register are set, which results in a non-privileged stack being restored and program execution continuing in the non-privileged mode.

The interrupt logic 224 comprises a CPU, processor, logic, software, or any combination of hardware and software that operates to allow an interrupt to be received and processed by the processing logic 202. For example, the interrupt logic 224 may receive a software interrupt that is generated by program code executed by the processing logic 202. In one embodiment, the function handler system uses the software interrupt to allow non-privileged program code to execute a privileged function within the same task and priority. In one embodiment, the interrupt logic 224 processes software interrupts, hardware interrupts, program exceptions, or any other type of interrupt as part of the operation of the function handler system.

It should be noted that the configuration of the device 102 is just one suitable configuration for implementing the described function handler system. It is also possible to implement one or more embodiments of the function handler system using other device configurations, functional elements or element configurations within the scope of the present invention.

During operation of the device 102, the processing logic 202 executes non-privileged application code (i.e., App-NP) and/or privileged application code (App-P). When either application requires the services of a privileged function, such as Func 110, the respective application calls the FH code 112 with an identifier that identifies the desired function (i.e., Func). The FH code 112 is non-privileged code, and so it may be called from either privileged or non-privileged applications.

The FH code determines the operating mode of the calling application, and based on the determined mode, executes selected procedures to call the privileged function Func to provide the requested services without creating a new task. The following is a summary of the procedures used by the FH 112 to respond to a request for the services of a privileged function.

1. Receive a request from an application to execute a function associated with an identifier that is passed with the request.
2. Determine the operating mode of the requesting application.
3. If the requesting application is executing in the privileged operating mode, then:
    a. Look up the requested privileged function based on the identifier.
    b. Call the privileged function.
    c. Return to the calling privileged application.
4. If the requesting application is executing in the non-privileged operating mode, then:
    a. Generate a software interrupt and pass the identifier.

b. Transition to a privileged mode interrupt handler.
c. Look up the requested privileged function based on the identifier.
d. Call the privileged function.
e. After the privileged function executes, restore the non-privileged registers
f. Return to the calling non-privileged application.

In one embodiment, the described function handler system comprises program instructions stored on a computer-readable media, which when executed by the processing logic 202, provides the functions described herein. In one or more embodiments, the computer-readable media comprises a floppy disk, CD, memory card, FLASH memory device, RAM, ROM, or any other type of memory device.

Figure 3:
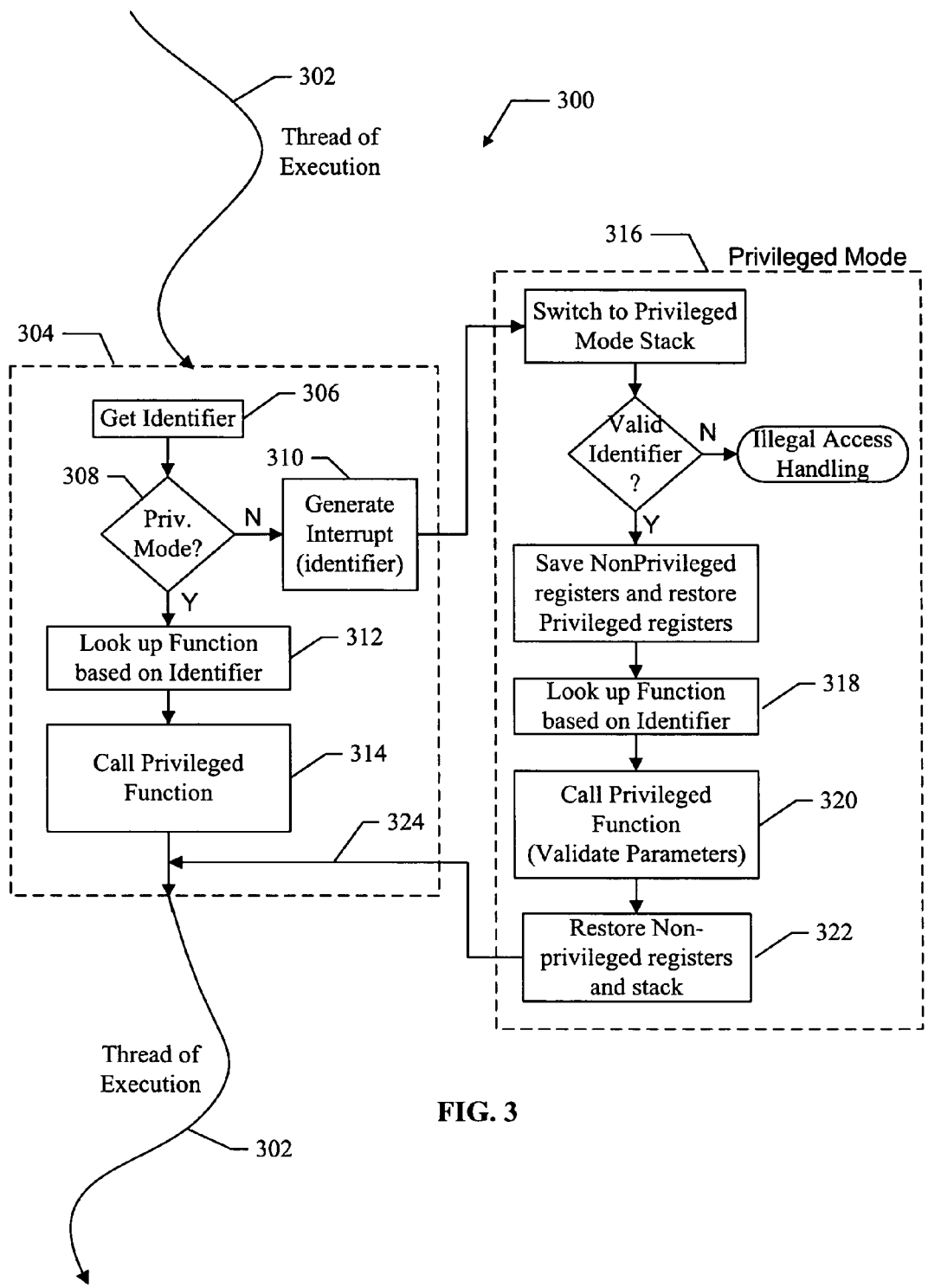
FIG. 3 shows a flow diagram that illustrates the operation of one embodiment of a function handler system for use in a device.

FIG. 3 shows a flow diagram 300 that illustrates the operation of one embodiment of a function handler system for use in a device, for example the device 102. For clarity, the flow diagram 300 will be described with reference to the device shown in FIG. 2. It will be assumed that the device is executing a BREW runtime environment that operates to create a thread of execution 302. The execution thread 302 represents the execution of privileged or non-privileged applications on the device.

A system scheduler (not shown) operates to schedule the execution of applications to form the thread of execution 302. Typically, the scheduler operates to schedule execution based on priority, but may operate to schedule execution based on other criteria. However, the function handler system described herein provides a function handler that operates within the same thread of execution as a calling application, thereby avoiding new task creation, associated scheduler complexity, and possible dispatcher latency.

The thread of execution 302 represents the execution of either the privileged application (App-P) or the non-privileged application (App-NP). The executing application may be a viewer application that allows the device to display various multimedia content to the device user. As the application executes, a requirement for the services of a privileged function (Func) occurs. To obtain services from the privileged function, the application calls the FH 304 and passes an identifier that identifies the privileged function Func. It will be assumed that privileged functions available in the system have an associated identifier that can be discovered by the executing application. In one or more embodiments, the following functions are performed by the processing logic 202 executing program instructions stored in the code memory 208, which may also process data in the data memory 210.

At block 306, the FH 304 obtains the identifier that identifies the privileged function Func. For example, the identifier may be passed to the FH in a register associated with the processing logic 202 or other memory location in the data memory 210.

At block 308, a test is performed to determine if the calling application is executing in the privileged or non-privileged mode. For example, the processing logic determines the current processing mode of the application by evaluating the processor status registers. If the calling application is executing in the non-privileged mode, the method proceeds to block 310. If the calling application is executing in the privileged mode, the method proceeds to block 312.

At block 312, it has been determined that the application is executing in the privileged mode. The FH code 304 looks up the requested privileged function (i.e., Func) based on the received identifier. For example, the processing logic 202 uses the identifier to access a data structure that maps available functions to identifiers to determine the function being requested by the calling application. The data structure may be stored in the data memory 210.

At block 314, the privileged function Func is called to perform the requested service. For example, the privileged function may access a system file or a hardware resource. In one embodiment, the processing logic executes program instructions to call the privileged function Func. Upon execution, the function Func may also perform various parameters checks and validations to verify that the calling application has passed legal and valid parameters. Once the function Func has completed executing, program flow returns to the thread of execution 302.

Therefore, if a privileged application calls the function Func through the FH 304, the FH 304 operates to determine the requested function, based on the identifier, and call that function to perform the requested service. If a non-privileged application calls the function Func through the FH 304, the FH 304 operates as follows to provide the requested service.

At block 310, the FH 304 generates an interrupt that operates to request that the operating mode of the device to transition to the privileged mode 316 so that the privileged function Func can execute. The interrupt may be a software interrupt or any other type of interrupt that may be generated by the FH 304. The interrupt includes the identifier passed from the calling application. For example, the interrupt may be generated and/or processed by interrupt logic 224 shown in FIG. 2.

After the interrupt is generated, program execution flows to privileged mode program code 316 where the privileged function Func is call within the same task as the calling application.

A brief description of the operation of program code 316 is provided below. However, for a more detailed description of the operation of the program code 316, the reader is referred to U.S. patent application Ser. No. 10/697,592, entitled "SYSTEM FOR PROVIDING TRANSITIONS BETWEEN OPERATING MODES OF A DEVICES," which is incorporated by reference herein.

After a switch to a privileged mode stack occurs and validation of the passed function identifier, the program execution flows to block 318.

At block 318, the desired privileged function is determined based on the passed identifier. For example, a data structure stored in the data memory 210 is search by the processing logic 202 based on the identifier to identify the desired function Func.

At block 320, once the privileged function Func is determined, it is called. For example, in one embodiment, the processing logic 202 executes instructions stored in the code memory 208 to call the function Func. The privileged function may operate to open a particular system file that contains data for use by the calling non-privileged application. In one embodiment, additional parameters are passed to the privileged function from the application. For example, the parameters may further indicate or define the type of service being requested by the non-privileged application. The privileged function operates to validate these parameters to verify that execution of the privileged function will not exceed the privileges granted to the application. For example, the function operates to validate the parameters so that execution of the function will not exceed memory restrictions placed on the application.

At block 322, after the function Func is performed, the non-privileged mode registers are restored, including the non-privileged mode stack. The program execution returns to the non-privileged application thread 302 as shown at path 324.

It should be noted that the program flow diagram 300 illustrates just one embodiment and that changes, additions, or rearrangements of the program elements may be made without deviating from the scope of the invention.

Accordingly, while one or more embodiments of methods and apparatus for a function handler system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

We claim:

1. A method for allowing an application to invoke a function on a device, wherein the device includes at least two operating modes comprising a privileged mode and a non-privileged mode, and the function executes in the privileged mode, the method comprising:
    receiving a request from the application to invoke the function;
    determining the operating mode of the application;
    invoking the function using an interrupt, if the application is executing in the non-privileged mode, wherein the function is executed within the same task as the application; and
    invoking the function directly, if the application is executing in the privileged mode.

2. The method of claim 1, wherein the interrupt is a software interrupt.

3. The method of claim 1, further comprising determining the function based on an identifier that is passed with the request.

4. The method of claim 1, further comprising returning to the application when the execution of the function is completed.

5. The method of claim 1, wherein the device is a wireless device.

6. Apparatus for allowing an application to invoke a function on a device, wherein the device includes at least two operating modes comprising a privileged mode and a non-privileged mode, and the function executes in the privileged mode, the apparatus comprising:
    logic that receives a request from the application to invoke the function;
    logic that determines the operating mode of the application;
    logic to invoke the function using an interrupt, if the application is executing in the non-privileged mode, wherein the function is executed within the same task as the application; and
    logic to invoke the function directly, if the application is executing in the privileged mode.

7. The apparatus of claim 6, wherein the interrupt is a software interrupt.

8. The apparatus of claim 6, further comprising an identifier associated with the request that identifies the function.

9. The apparatus of claim 6, wherein the device is a wireless device.

10. Apparatus for allowing an application to invoke a function on a device, wherein the device includes at least two operating modes comprising a privileged mode and a non-privileged mode, and the function executes in the privileged mode, the apparatus comprising:
    means for receiving a request from the application to invoke the function;
    means for determining the operating mode of the application;
    means for invoking the function using an interrupt, if the application is executing in the non-privileged mode, wherein the function is executed within the same task as the application; and
    means for invoking the function directly, if the application is executing in the privileged mode.

11. The apparatus of claim 10, wherein the interrupt is a software interrupt.

12. The apparatus of claim 10, further comprising identifier means for identifying the function.

13. The apparatus of claim 10, wherein the device is a wireless device.

14. A computer-readable media comprising instructions, which when executed by a processor in a device, operate to allow an application to invoke a function on a device, wherein the device includes at least two operating modes comprising a privileged mode and a non-privileged mode, and the function executes in the privileged mode, the computer-readable media comprising:
    instructions for receiving a request from the application to invoke the function;
    instructions for determining the operating mode of the application;
    instructions for invoking the function using an interrupt, if the application is executing in the non-privileged mode, wherein the function is executed within the same task as the application; and
    instructions for invoking the function directly, if the application is executing in the privileged mode.

15. The computer-readable media of claim 14, wherein the interrupt is a software interrupt.

16. The computer-readable media of claim 14, further comprising instructions for determining the function based on an identifier that is passed with the request.

17. The computer readable media of claim 14, further comprising instructions for returning to the application when the execution of the function is completed.

18. The computer-readable media of claim 14, wherein the device is a wireless device.

* * * * *